Aug. 29, 1961 A. E. ROHDE 2,998,028
FLEXIBLE TUBE OR HOSE
Filed July 21, 1958

INVENTOR
Adolf E. Rohde

By Pollard, Johnston
Smythe and Robertson
ATTORNEYS

2,998,028
FLEXIBLE TUBE OR HOSE
Adolf Ernst Rohde, Sulldorfer Landstr. 252,
Hamburg-Blankenese, Germany
Filed July 21, 1958, Ser. No. 749,687
Claims priority, application Germany July 30, 1957
7 Claims. (Cl. 138—109)

My invention concerns a flexible tube or hose which can be bent into various shapes such as angle pieces and which remains in a given position until it is rebent into another direction, e.g. into a straight line or into a different angle, curve or the like.

Tubes or hoses of this kind that may be used e.g. as conduits of cables for lamps on worktables, as pipe lines for compressed air and especially as conduits for a cooling medium on machine tools, usually consist nowadays of wound metal strips and are relatively expensive on account of the stainless steel to be used. In addition, they are quite heavy so that they, especially after a certain wear, do not retain the shapes into which they had been bent. They have then to be tied up provisionally or secured otherwise, because they lose their stableness of form and this again could cause breakdowns of service and inconveniences.

The main object of my invention is a novel construction of a tube or hose that avoids the above mentioned disadvantages. More particularly it consists in encasing loosely one or more flexible and non-resilient wires, which are able to hold their shape into the wall of a supple tube, where they longitudinally are shiftable.

The wall of the tube or hose may preferably consist of any synthetic material such as polyvinyl chloride or other molded materials or of rubber. Soft copper has been proved to be a very suitable metal for the wires that are encased, though the invention is not restricted to this material.

As a rule, the arrangement will be made so that a plurality, e.g. three or four, of wires will be disposed equidistantly on a circle coaxial with the axis of the tube or hose. Anyhow, any other arrangements would be possible, too, f.i. in such a way that the lumen of the tube is slightly off center with regard to the axis of the tube and that a single, relatively thick wire is inserted into the thicker part of the wall of the tube.

In order that the tube may be bent in all directions and, if required, may also be twisted a bit, the encased wires must remain freely movable; they don't form a rigidly connected unit with the wall of the tube. To this end it is expedient that small channels or conduits be formed in the wall of the tube for freely inserting the wires. Such conduits may easily be produced when making the tube by an extrusion process. Of course, provision must be made to close the wire conduits at the end faces of tube-piece that have been cut off from a length of hose material. This can easily be done by the fittings that are to be attached to the ends of the tube, thus, limiting the movement of the wire inserts in a natural way without the use of any special closing members.

My invention is illustrated by way of example in the drawings which show two embodiments.

Figure 1:
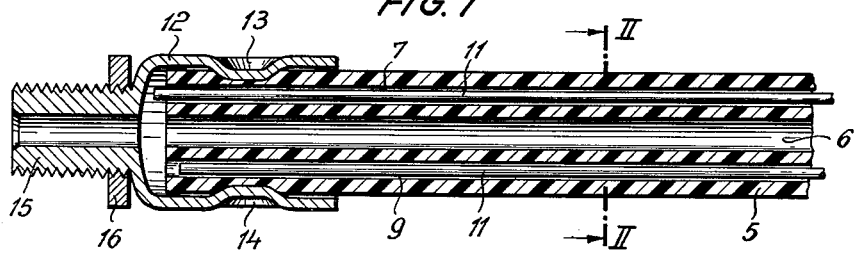
FIG. 1 is a longitudinal section of the end of a tube or hose according to the invention.
Figure 2:
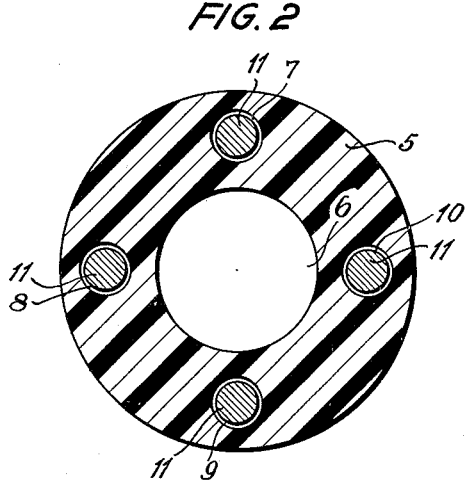
FIG. 2 is a cross-section taken on the line II—II of FIG. 1.

Referring to FIGS. 1 and 2, the numeral 5 generally designates a tube or hose that is made of polyvinyl chloride. On a circle concentric with the axis of the lumen 6 of the tube, four small bores 7, 8, 9 and 10 are provided in the wall of the tube. In each of these bores there is located a wire 11 of soft copper in such a manner that it may longitudinally move therein.

The end of tube 5 is provided with a fitting 12 in the shape of a sleeve which is rigidly secured to the tube by means of indentations 13 and 14, and bears at its front end a threaded extension 15 with a locking nut 16 for attaching the tube to any kind of apparatus. The extension 15 could also be provided at its rear end with a nipple that projects into the tube which in this way is tightly secured between the nipple and the sleeve 12. The other end of the tube—not illustrated in the drawings—could be provided with an outlet nozzle.

If the tube shown in FIG. 1 is bent in any direction, the shape of the wires 11 will be changed correspondingly and, since the wires do not spring back, but rather retain their shape (until they are again bent in another direction), the tube retains the given shape as an angle, curve, helix or the like. As the wires 11 do not lie in the axis of the tube, they are stressed differently according to whether they lie on the outside or on the inside of a curve or angle. Since they, however, can move relatively unrestrictedly in the conduits 7, 8, 9 and 10, they can readily adapt themselves to any contingency. In FIG. 1 there is shown, only for reasons of illustration, how wire 11 projects from conduit 7 at the end face of the tube, whereas the wire of conduit 9 has moved a short distance in the opposite direction. These movements of the wires are limited automatically by the wires coming into contact with the fittings 12 or any other closure of the tube.

Figure 3:
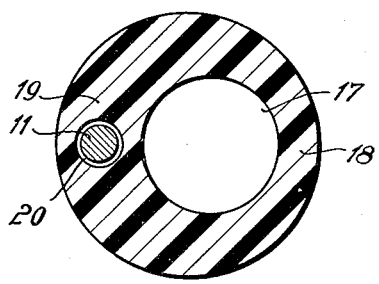
FIG. 3 is a cross-section of another embodiment.

FIG. 3 illustrates an embodiment of the invention where the lumen 17 of the tube or hose 18 is disposed slightly excentrically with relation to the axis of the outer cylindrical surface of the tube. A single conduit 20 is provided in the thicker part 19 of the tube wall in which conduit a corresponding wire 11 is placed.

It is to be understood that the basic idea of the invention may be embodied otherwise than has been described with reference to the drawings. Thus, it would be possible in such cases where the tube is to be bent only in one plane, to use flat strip-like inserts instead of circular wires; in case of a plurality of such flat wires, these must be disposed in such a way that all strips lie with their flat sides in planes parallel to one another.

What I claim is:

1. A flexible tube comprising an elongated tubular body of a supple non-metallic material having at least one longitudinal bore within the wall thereof, and a flexible and non-resilient wire encased loosely in and shiftable longitudinally relative to said bore, and extending within said bore through a bendable portion of the length of said body, said wire upon a bending of said body portion conforming to and maintaining the shape of the bend.

2. A flexible tube comprising an elongated tubular body of a supple non-metallic material having at least one longitudinal bore within the wall thereof, and a flexible and non-resilient wire encased loosely in said bore and extending within said bore through a bendable portion of the length of saidy body, said wire being deformable in and freely shiftable longitudinally relative to said bore by bending of said body to hold the tube in bent position.

3. A flexible tube comprising an elongated tubular body of supple non-metallic material having a plurality of longitudinal bores within the wall thereof, said bores being arranged symmetrically about the axis of said body, and a plurality of flexible and non-resilient wires encased loosely in said bores and each extending within one of said bores through a bendable portion of the length of said body, said wires being deformable in and shiftable longitudinally relative to said bores by bending of said body to hold the tube in bent position.

4. A flexible tube comprising an elongated cylindrical tubular body of supple non-metallic material forming an eccentric passageway therethrough, the wall of said body being thicker along one side of said passageway than along the opposite side thereof, a longitudinal bore within the thicker part of said wall, and a flexible and non-resilient wire encased loosely in said bore, said wire extending within said bore through a bendable portion of the length of said body and being deformable in and shiftable longitudinally relative to said bore by bending of said body to hold the tube in bent position.

5. A flexible tube comprising an elongated tubular body of flexible synthetic plastic material having at least one longitudinal bore within the wall thereof, and a flexible and non-resilient metal wire encased loosely in said bore and extending within said bore through a bendable portion of the length of said body, said wire being deformable in and shiftable longitudinally relative to said bore by bending of said body to hold the tube in bent position.

6. A flexible tube comprising an elongated flexible tubular body of polyvinyl chloride having at least one longitudinal bore within the wall thereof, and a flexible copper wire encased loosely in said bore and extending within said bore through a bendable portion of the length of said body, said wire being deformable in and shiftable longitudinally relative to said bore by bending of said body to hold the tube in bent condition.

7. A flexible tube comprising an elongated tubular body of a supple non-metallic material having at least one longitudinal bore within the wall thereof, and a flexible and non-resilient wire encased loosely in and shiftable longitudinally relative to said bore and extending within said bore through a bendable portion of the length of said body, and abutment means fitted over the ends of said body to limit the longitudinal movements of said shiftable wire.

References Cited in the file of this patent

UNITED STATES PATENTS

| | | |
|---|---|---|
| 392,040 | Lee | Oct. 30, 1888 |
| 2,704,556 | Blish | Mar. 22, 1955 |
| 2,800,145 | Peierls et al. | July 23, 1957 |
| 2,922,613 | Beacham et al. | Jan. 26, 1960 |

FOREIGN PATENTS

| | | |
|---|---|---|
| 447,816 | Great Britain | May 26, 1936 |
| 647,226 | Great Britain | Dec. 6, 1950 |
| 32,983 | Germany | Sept. 12, 1885 |